United States Patent Office 2,860,137
Patented Nov. 11, 1958

2,860,137

HALOGENATED 10-PHENOTHIAZINYLALKYL-AMINOALKANOIC ACID ESTERS AND AMIDES

John W. Cusic, Skokie, and Harman S. Lowrie, Northbrook, Ill., assignors to G. D. Searle & Co., Chicago, Ill., a corporation of Delaware No Drawing. Application August 16, 1956
Serial No. 604,309

10 Claims. (Cl. 260—243)

This invention relates to tertiary halogenated 10-phenothiazinylalkylamines wherein the remaining substituents on the acyclic nitrogen atom are alkyl radicals distinguished by the presence of at least one acid residue. More particularly, this invention relates to compounds having the formula

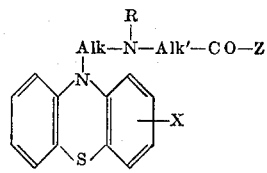

in which Alk and Alk' are alkylene radicals, the same or different; Z is a lower alkoxy, amino, or (lower alkyl)-amino radical; R is a lower alkyl radical optionally substituted in terminal position by the radical

—CO—Z

Z being defined as before; and X is halogen, optimally chlorine in the 2-position.

The alkylene radicals preferably comprehended by Alk in the foregoing generic formula are those containing either 2 or 3 carbon atoms, namely, the ethylene

and straight- or branched-chain proplyene

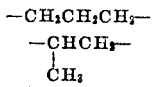

radicals. Where Alk' is designated, alkylene radicals of choice are those containing one or two carbon atoms, namely, the methylene

and ethylene radicals. The lower alkoxy radicals contemplated in the structural formula for compounds of the present invention are those represented by —O-lower alkyl lower alkyl radicals being inclusive of methyl, ethyl, propyl, isopropyl, butyl, isobutyl, sec-butly, tert-butyl, amyl, sec-n-amyl, primary isoamyl, sec-isoamyl, tert-amyl, and like $C_nH_{2n+1}$ radicals wherein n is a positive integer amounting to less than 9. The amino and (lower alkyl) amino radicals intended are those of the formula

—NH₂ and

—NH-lower alkyl respectively, "lower alkyl" having the meaning assigned above. When R in the structural formula stands for a terminally substituted moiety, it denotes —Alk'—CO—Z the elements Alk' and Z therein being defined as before.

The compounds to which this invention relates are useful because of their valuable pharmacological properties. For example, the subject compounds are central nervous system depressants characterized by the capacity to induce tranquility or ataraxia untroubled by mental or emotional excitation. Moreover, the compounds here disclosed possess desirable anti-emetic properties.

Equivalent to the basic amines of this invention for the purposes here described are those non-toxic acid addition salts corresponding thereto of the formula

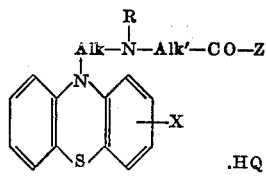

wherein Alk, Alk', R, Z, and X are defined as before; and Q is one equivalent of an anion—for example, chloride, bromide, iodide, nitrate, phosphate, sulfate, sulfamate, methyl sulfate, ethyl sulfate, benzenesulfonate, toluenesulfonate, acetate, lactate, succinate, malate, tartrate, citrate, gluconate, ascorbate, benzoate, cinnamate, or the like—which, in combination with the cationic portion of a salt aforesaid, is neither pharmacologically nor otherwise undesirable in pharmaceutical dosage.

The amine bases which comprise this invention are relatively insoluble in water, but may be dissolved in dilute acids and in such of the common organic solvents as alcohol, ethyl acetate, chloroform, and ether. The acid addition salts of the invention are, on the other hand, soluble in water and in aqueous solutions of alcohol or other water-miscible organic solvents. The subject compounds may be administered in solid form as tablets or capsules; dissolved or suspended in aqueous media, they may be given parenterally.

The compounds of the present discovery may be manufactured by interaction of a suitable 10-chloroalkylhalophenothiazine with an appropriate amino acid ester or amide, using an oxygenated solvent such as acetone or butanone for a reaction medium, and with sufficient anhydrous base present solely to neutralize acid formed in process. Sodium iodide is optionally employed for catalytic purposes. An alternative method specifically recommended for preparation of the unsubstituted amide hereinafter described in Example 4A consists in treating an alcoholic solution of the corresponding ester with ammonia under pressure.

The following examples describe in detail certain of the compounds illustrative of this invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade (° C.), pressures in millimeters (mm.) of mercury, and relative amounts of materials in parts by weight, except as otherwise noted.

*Example 1*

A. *N-(2 - ethoxycarbonylethyl)-N-methyl-3-(2-chloro-10-phenothiazinyl)propylamine.*—A mixture of 53 parts of ethyl β-methylaminopropionate, 62 parts of 10-(3-chloropropyl)-2-chlorophenothiazine, 30 parts of sodium iodide, and 14 parts of anhydrous potassium carbonate in 3000 parts of butanone is heated, with agitation, at the boiling point under reflux overnight. The reaction mixture is then filtered and the filtrate thereupon evaporated to dryness. The oily residue is dissolved in ether, and the ether solution is washed with water and finally extracted with dilute aqueous muriatic acid. The acid solution is washed with ether, then made basic with dilute aqueous caustic soda. The resultant mixture is extracted with ether, the ether extract being washed well with water and subsequently dried over anhydrous potassium carbonate. Solvent is finally removed by evaporation. The oily product which remains is N-(2-ethoxycarbonylethyl)-N-methyl-3-(2 - chloro-10-phenothiazinyl)propylamine, of the formula

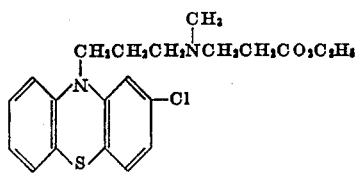

B. *N-(2 - ethoxycarbonylethyl)-N-methyl-3-(2-chloro-10 - phenothiazinyl)propylamine hydrochloride.*—N-(2-ethoxycarbonylethyl) - N - methyl-3-(2-chloro-10-phenothiazinyl)propylamine is converted to the corresponding hydrochloride by treatment in chloroform solution with a slight excess of hydrogen chloride dissolved in isopropyl alcohol, followed by precipitation with anhydrous ether. The desired acid addition salt comes down as a white powder which, recovered by filtration and dried, melts at 143–146° C.

*Example 2*

A. *3-butylamino-N-butylpropionamide.*—To a solution of 300 parts of n-butylamine in 300 parts of ethyl alcohol at temperatures below −60° C. is slowly added 86 parts of methyl acrylate dissolved in 100 parts of ethyl alcohol. The resulting solution is allowed to warm slowly to room temperatures and let stand for 24 hours, then placed in a steel bomb and heated at 150° C. for 24 hours. Distillation affords pure 3-butylamino-N-butylpropionamide as a clear oil boiling at 130–135° C. under 10 mm. pressure. The product has the formula

B. *N - butyl - N-(2 - butylcarbamylethyl)-2-(2-chloro-10-phenothiazinyl)ethylamine.*—Using the technique of Example 1A, but replacing the ethyl β-methylaminopropionate therein with 80 parts of 3-butylamino-N-butylpropionamide, and substituting a like amount of 10-(2-chloroethyl)-2-chlorophenothiazine for the 10-(3-chloropropyl)-2-chlorophenothiazine specified, there results N-butyl-N-(2-butylcarbamylethyl) - 2 - (2-chloro-10-phenothiazinyl)ethylamine which, subjected to a short-path distillation under 0.1 mm. pressure at jacket temperatures in the neighborhood of 240–260° C., is obtained as a yellow oil. The product has the formula

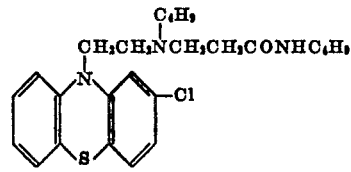

*Example 3*

A. *N,N - dimethoxycarbonylmethyl - 3 - (2-chloro-10-phenothiazinyl)propylamine.*—A mixture of 95 parts of di(methoxycarbonylmethyl)amine, 180 parts of 10-(3-chloropropyl)-2-chlorophenothiazine, 85 parts of sodium iodide, and 42 parts of anhydrous potassium carbonate in 4000 parts of butanone is heated, with agitation, at the boiling point under reflux overnight. The reaction mixture is then filtered, whereupon the filtrate is evaporated to dryness. The oil which remains as a residue is taken up in ether; and this ether solution is washed, seriatim, once with dilute aqueous sal soda, and thrice with water. The solution is then dried over anhydrous potassium carbonate, following which dry hydrogen chloride is bubbled in. The precipitate which forms is filtered off, washed well with ether, and then dissolved in chloroform. An excess of ammonia is next introduced, whereupon the ammonium chloride thrown down is filtered off. Evaporation of the filtrate leaves an oil which, subjected to short-path distillation at 0.1 mm. pressure, affords the desired N,N-dimethoxycarbonylmethyl-3-(2-chloro-10-phenothiazinyl)propylamine as a yellow oil. The product has the formula

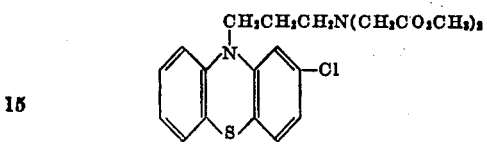

B. *N,N-dimethoxycarbonylmethyl - 3 - (2 - chloro-10-phenothiazinyl)propylamine hydrochloride.* — N,N-dimethoxycarbonylmethyl-3-(2 - chloro-10-phenothiazinyl)propylamine hydrochloride is prepared by the same technique detailed in Example 1B above. This material melts at 62–67° C.

*Example 4*

A. *N,N-di(carbamylmethyl) - 3 - (2-chloro-10-phenothiazinyl)propylamine.*—N,N-dimethylcarbonylmethyl-3-(2-chloro-10-phenothiazinyl)propylamine is dissolved in ethyl alcohol by boiling 100 parts of the alcohol with 19 parts of ester. The solution is then cooled to 0° C. and saturated at this temperature with ammonia. The resulting solution is heated in a sealed kettle at 60° C. overnight, then evaporated to a small volume which is diluted with n-pentane. Supernatant liquors are decanted from the oil which settles out, and after a second concentration to small volume, are diluted at the boiling point with mixed heptanes until cloudiness is achieved. There precipitates, on cooling, colorless crystalline N,N-dicarbamylmethyl-3-(2-chloro - 10 - phenothiazinyl)propylamine, which recrystallized from acetone, melts at 161–168° C. The product has the formula

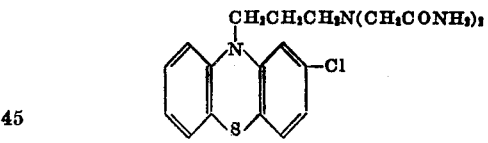

B. *N,N-dicarbamylmethyl - 3 - (2 - chloro-10-phenothiazinyl)propylamine hydrochloride.*—Using the procedure described in Example 1B above, there is obtained N,N - dicarbamylmethyl-3-(2-chloro-10-phenothiazinyl)propylamine hydrochloride, which melts at 180–185° C.

*Example 5*

A. *N-ethoxycarbonylmethyl - N - methyl-3-(2-chloro-10-phenothiazinyl)propylamine.*—Using the technique of Example 1A but substituting the 53 parts of ethyl β-methylaminopropionate therein with 47 parts of ethyl sarcosinate, there is obtained N-ethoxycarbonylmethyl-N-methyl-3-(2-chloro - 10 - phenothiazinyl)propylamine. Upon short-path distillation at 0.5 mm. pressure, using jacket temperatures in the neighborhood of 230–250° C., the product comes over as a yellow oil. It has the formula

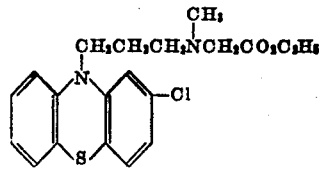

B. *N-ethoxycarbonylmethyl - N - methyl-3-(2-chloro-10-phenothiazinyl)propylamine hydrochloride.*—Proceeding in accordance with the technique described in Example 1B, N-ethoxycarbonylmethyl-N-methyl-3-(2-chloro-10-phenothiazinyl)propylamine is converted to the corresponding hydrochloride, which melts at 143–146° C.

Example 6

A. *N-carbamylmethyl-N-methyl-3-(2-chloro-10-phenothiazinyl)propylamine.*—Substituting 44 parts of sarcosinamide for 53 parts of ethyl β-methylaminopropionate specified in Example 1A, but otherwise proceeding in accordance with the procedure there disclosed, there is obtained N-carbamylmethyl - N - methyl-3-(2-chloro-10-phenothiazinyl)propylamine, which, on short-path distillation at 0.5 mm. pressure, comes over as a yellow oil. The product has the formula

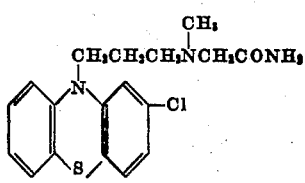

B. *N-carbamylmethyl-N-methyl-3-(2-chloro-10-phenothiazinyl)propylamine hydrochloride.*—N-carbamylmethyl-N-methyl-3-(2-chloro-10-phenothiazinyl)propylamine, on treatment with hydrogen chloride as described in Example 1B, gives the above-identified acid addition salt, which melts at 107–109° C.

Example 7

A. *N-methylsarcosinamide.*—To a solution of 27 parts of methylamine in 100 parts of toluene at 0° C. is added 25 parts of ethyl chloroacetate dissolved in 25 parts of toluene. The reaction mixture is then heated in a sealed kettle at 80° C. overnight. After cooling to 0° C., precipitated material is filtered off; and the filtrate is concentrated and distilled to give N-methylsarcosinamide as a clear oil, boiling at 70–90° C. under 0.4 mm. pressure. The product has the formula

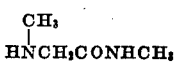

B. *N-methylcarbamylmethyl - N - methyl-3-(2-chloro-10-phenothiazinyl)propylamine.*—Using the technique of Example 1A, but employing 41 parts of N-methylsarcosinamide in place of the 53 parts of ethyl β-methylamino-propionate therein specified, there is obtained N-methylcarbamylmethyl-N-methyl-3-(2 - chloro-10-phenothiazinyl)-propylamine, which distills as a yellow oil at 230–250° C. jacket temperature under 0.1 mm. pressure. The product has the formula

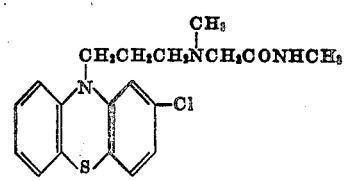

C. *N-methylcarbamylmethyl - N - methyl-3-(2-chloro-10-phenothiazinyl)propylamine hydrochloride.*—Interaction of N-methylcarbamylmethyl-N-methyl-3-(2-chloro-10-phenothiazinyl)propylamine and hydrogen chloride according to the procedure detailed in Example 1B above produces the corresponding acid addition salt, which melts at 93–98° C.

What is claimed is:

1. A compound of the formula

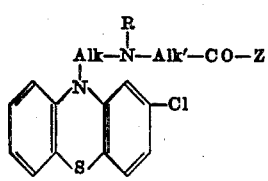

wherein Alk is an alkylene radical containing at least 2 and less than 4 carbon atoms; Alk' is an alkylene radical containing fewer than 3 carbon atoms; Z is selected from the group consisting of lower alkoxy, amino, and (lower alkyl) amino radicals; and R is selected from the group consisting of lower alkyl radicals and lower alkyl radicals terminally substituted by the radical

Z being defined as before.

2. N - carbamylmethyl-N-methyl-3-(2-chloro-10-phenothiazinyl)propylamine.

3. N,N - dicarbamylmethyl - 3-(2-chloro-10-phenothiazinyl)propylamine.

4. A compound of the formula

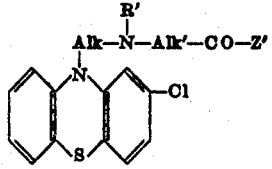

wherein Alk is an alkylene radical containing at least 2 and less than 4 carbon atoms, Alk' is an alkylene radical containing fewer than 3 carbon atoms, Z' is a (lower alkyl) amino radical, and R' is a lower alkyl radical.

5. N-methylcarbamylmethyl-N-methyl-3-(2-chloro-10-phenothiazinyl)propylamine.

6. In a process for manufacturing compounds of the formula

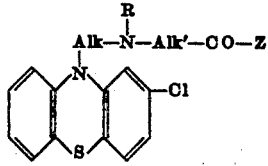

wherein Alk is an alkylene radical containing at least 2 and less than 4 carbon atoms; Alk' is an alkylene radical containing fewer than 3 carbon atoms; Z is selected from the group consisting of lower alkoxy, amino, and (lower alkyl)amino radicals; and R is selected from the group consisting of lower alkyl radicals and lower alkyl radicals terminally substituted by the radical

Z being defined as before, the step which comprises contacting a 10-(ω-chloroalkyl)-2-chlorophenothiazine of the formula

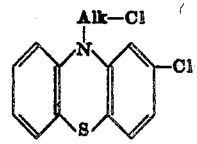

wherein Alk is defined as before, with an amino acid derivative of the formula

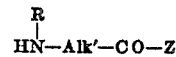

wherein Alk', R, and Z are defined as before, an oxygenated solvent and anhydrous base being present in the reaction medium.

7. In a process for manufacturing compounds of the formula

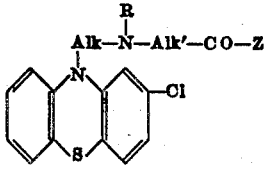

wherein Alk is an alkylene radical containing at least 2 and less than 4 carbon atoms; Alk' is an alkylene radical containing fewer than 3 carbon atoms; Z is selected from the group consisting of lower alkoxy, amino, and (lower alkyl)amino radicals; and R is selected from the group consisting of lower alkyl radicals and lower alkyl radicals terminally substituted by the radical

—CO—Z

Z being defined as before, the step which comprises contacting a 10-(ω-chloroalkyl)-2-chlorophenothiazine of the formula

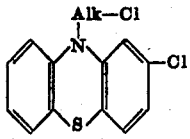

wherein Alk is defined as before, with an amino acid derivative of the formula

wherein Alk', R, and Z are defined as before, butanone being used as solvent in the presence of anhydrous potassium carbonate, and with sodium iodide added for catalytic purposes.

8. A compound of the formula

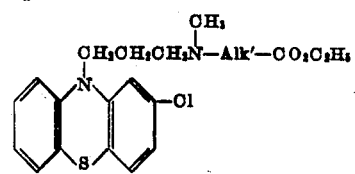

wherein Alk' is an alkylene radical containing fewer than three carbon atoms.

9. N-ethoxycarbonylmethyl-N-methyl-3-(2-chloro-10-phenothiazinyl)propylamine.

10. N,N-dimethoxycarbonylmethyl-3-(2-chloro-10-phenothiazinyl)propylamine.

References Cited in the file of this patent
UNITED STATES PATENTS

| | | |
|---|---|---|
| 2,645,640 | Charpentier | July 14, 1953 |

FOREIGN PATENTS

| | | |
|---|---|---|
| 1,003,140 | France | Nov. 14, 1951 |
| 1,028,112 | France | Feb. 25, 1953 |